(12) United States Patent
Adusumilli et al.

(10) Patent No.: US 8,020,201 B2
(45) Date of Patent: Sep. 13, 2011

(54) SELECTING A SECURITY FORMAT CONVERSION FOR WIRED AND WIRELESS DEVICES

(75) Inventors: Koteshwerrao S. Adusumilli, San Diego, CA (US); John B. Abjanic, San Diego, CA (US)

(73) Assignee: Intel Corporation, Santa Clara, CA (US)

( * ) Notice: Subject to any disclaimer, the term of this patent is extended or adjusted under 35 U.S.C. 154(b) by 2190 days.

(21) Appl. No.: 10/000,154

(22) Filed: Oct. 23, 2001

(65) Prior Publication Data

US 2003/0081783 A1     May 1, 2003

(51) Int. Cl.
*G06F 9/00* (2006.01)
*G06F 15/16* (2006.01)

(52) U.S. Cl. .......................... 726/12; 380/270; 709/230
(58) Field of Classification Search .................. 713/151; 726/12; 380/270; 709/230
See application file for complete search history.

(56) References Cited

U.S. PATENT DOCUMENTS

| | | | |
|---|---|---|---|
| 5,699,431 A | 12/1997 | Van Oorschot et al. | |
| 5,982,898 A | 11/1999 | Hsu et al. | |
| 6,092,202 A | 7/2000 | Veil et al. | |
| 6,125,349 A | 9/2000 | Maher | |
| 6,216,231 B1 | 4/2001 | Stubblebine | |
| 6,230,269 B1 | 5/2001 | Spies et al. | |
| 6,289,460 B1 | 9/2001 | Hajmiragha | |
| 6,308,277 B1 | 10/2001 | Vaeth et al. | |
| 6,367,009 B1 | 4/2002 | Davis et al. | |
| 6,473,406 B1 | 10/2002 | Coile et al. | |
| 6,571,221 B1 | 5/2003 | Stewart et al. | |
| 6,690,304 B1 | 2/2004 | Shirokura et al. | |
| 7,055,171 B1 * | 5/2006 | Martin et al. | 726/3 |
| 7,099,284 B2 | 8/2006 | Halme | |
| 7,237,261 B1 | 6/2007 | Huber et al. | |
| 2001/0001234 A1 | 5/2001 | Addy | |
| 2002/0019223 A1 | 2/2002 | Lee et al. | |
| 2002/0099957 A1 | 7/2002 | Krammer et al. | |
| 2002/0133598 A1 * | 9/2002 | Strahm et al. | 709/228 |
| 2002/0146129 A1 | 10/2002 | Kaplan | |
| 2002/0178365 A1 | 11/2002 | Yamaguchi | |

(Continued)

FOREIGN PATENT DOCUMENTS

EP     1 083 722     1/2000

(Continued)

OTHER PUBLICATIONS http://www.networksorcery.com/enp/protocol/ip/ports09000.htm (1998-2011), Network Sorcery, Inc.*

(Continued)

*Primary Examiner* — Christopher J Brown
(74) *Attorney, Agent, or Firm* — Blakely, Sokoloff, Taylor & Zafman LLP

(57) ABSTRACT

A selection system and method to receive an indication of a security format from a network and to select one of a plurality of security format conversions based on the received indication is described. The indication may be an indication of a wireless security format such as WTLS used by a wireless access device or a wired security format such as SSL used by a wired access device and the security format conversion selected based on the indication may be to another secured format or a plain data format. The indication may include an indication of a port and an indication of a security feature that is supported by the access device.

30 Claims, 13 Drawing Sheets

U.S. PATENT DOCUMENTS

| | | | |
|---|---|---|---|
| 2003/0046532 A1* | 3/2003 | Gast | 713/151 |
| 2003/0050896 A1 | 3/2003 | Wiederin | |
| 2004/0010684 A1 | 1/2004 | Douglas | |

FOREIGN PATENT DOCUMENTS

| | | |
|---|---|---|
| EP | 1083722 A2 | 12/2000 |
| EP | 1083722 A3 | 12/2000 |
| EP | 1083722 | 5/2001 |
| GB | 2 395 877 | 5/2003 |
| TW | 448658 | 8/2001 |
| TW | 463510 | 11/2001 |
| WO | WO-0028752 | 5/2000 |
| WO | WO-0041364 | 7/2000 |
| WO | WO 03/036913 A2 | 5/2003 |
| WO | WO 03/036913 A3 | 5/2003 |
| WO | WO 03/061246 | 7/2003 |

OTHER PUBLICATIONS

Jormalainen, et al., "Security in the WTLS," Internet Citation, Nov. 3, 1999, Retrieved from the Internet: www.tml.hut.fi/Opinnot/Tik-110.501/1999/papers/wtls.wtls.html. 17 pages.

Kwon, et al., "Integrated Transport Layer Security End-to-End Security Model Between WTLS and TLS," *Conference Proceedings Article*, 2001, pp. 65-71.

PCT/US 02/33997, May 18, 2004, PCT Search Report.
PCT/US 02/33997, Oct. 23, 2002, PCT Search Report.
PCT/US 03/00893, Jan. 10, 2003, PCT Search Report.
PCT/US 03/00893, Jan. 10, 2003, Written Opinion.

Luotonen A.; "Tunneling SSL Through a WWW Proxy", Netscapse Communications Corporation. Dec. 14, 1995. XP002167506. pp. 1-4.

BIG-IP® e-Commerce Controller 800. WebPage [online] [retreived on Jan. 9, 2002] Retrieved on the Internet:http://www.f5.com/f5products/bigip/ecommerce/. pp. 1-5.

SSL Center. Sonic Wall—SSL Center—Welcome. WebPage [online] [retrieved on Jan. 9, 2002] Retrieved on the Internet:http://www.conicwall.com/ssl-center/index.html. p. 1.

Secure Network Solutions. NOKIA; Secure Socket Layer (SSL) Acceleration. WebPage [online] [retrieved on Jan. 9. 2002] Retrieved on the Internet:http://www.nokia.com/securenetworksolutions/itcm/ssl.html. pp. 1-2.

Jormalainen et al., "Security in the WTLS," Internet citation, Nov. 3, 1999, Retrieved from the internet: <URL:http://www.tml.hut.fi/Opinnot/Tik-110.501/1999/papers/wtls.wtls.html> ; retrieved on May 16, 2001, the whole document.

Eun-Kyeong Kwon et al: "Integrated Transport Layer Security End-to-End Security Model Between WTLS and TLS," Conference Proceedings Article, 2001. pp. 65-71.

"ROC (Taiwan) Patent Application No. 092100518 Search Report", (Jul. 11, 2009), 1 pg.

SSL 3.0 Specification. Webpage [online] [retrieved Sep. 17, 2001] Retrieved from the Internet: <URL: http://www.home.netscape.com/eng/ss13/3-SPEC.HTM. pp. 1-29.

The WirelessFAQ, Webpage [online] allNetDevices—The Wireless FAQ:9.11 How secures is WAP with SSL and WTLS? Last updated Jun. 26, 2001. [retrieved on Sep. 26, 2001] Retrieved from the Internet: <URL://http://www.devices.internet.com/faq/?pair=09.010.pp. 1-3.

Nokia WAP Server 1.1. Nokia: Product Data Sheet. Feb. 2000.pp. 1-2.

Secure Execution Engine. Whitepaper. nCIPHER™. pp. 1-12. Retrieved from the Internet on Sep. 27, 2001.

Webpage [online]. Fatbrain—The WAP Gap. [retrieved on Sep. 11, 2001] Retrieved from the Internet: <URL:http://www1.fatbrain.com/fbt/offers/wirelesscenter/wapgap.asp. pp. 1-5.

Stephen Cobb, The flip side of the wireless explosion: Dealing with WAP-gap security risks. Webpage [online]. Serverworld: Sun Server Archives: Jan. 2001 Issue. [retrieved on Sep. 11, 2001] Retrieved on the Internet: <URL: http://www.serverworldmagazine.com/sunserver/2001/01/wapgap.shtml. pp. 1-4.

Rainbow iVEA Introduces the IVEA NetSwift2012 Security Applicance for Both Wireless and Wired Internet Connectivity. Webpage [online] Las Vegas, NV; May 8, 2001. [retrieved on Sep. 11, 2001] Retrieved from the Internet: <URL: http:///www.rainbow.com/press/pr010508.html. pp. 1-4.

Intel NetStructure: Expediting XML Transactions. Product Data Sheet. A Standish Group Research Note Copyright © 2000. 4 pages.

Intel® NetStructure™ 7115 e-Commerce Accelerator; improve speed for secure online transactions. Product Overview. Webpage [online]. [retrieved on Aug. 7, 2001] Retrieved from the Internet: <URL: http://www.intel.com/network/idc/products/accel_7115.htm. pp. 1-2.

Intel® NetStructure™ 7115 e-Commerce Accelerator; improve speed for secure online transactions. Technical Overview. Webpage [online] [retrieved on Aug. 7, 2001] Retrieved from the Internet: <URL: http://www.intel.com/network/idc/products/accel_7115_technical.htm. pp. 1-2.

Designing a Secured Website. What you need to know about SSL Benchmarking. Intel®. Whitepaper. pp. 1-23, 1999.

Wireless Application Protocol, Whitepaper. W@P Forum. Wireless Internet Today—Jun. 2000. pp. 1-19.

Wireless Transport Layer Security; Version Apr. 6, 2001. Wireless Application Protocol; WAP-261-WTLS-20010406-a. pp. 1-106.

WAP Transport Layer End-to-end Security. Approved Version 28—Jun. 2001.Wireless Application Protocol WAP-187-TLE2E-20010628-a. pp. 1-24.

W@P™ Forum. Wireless Application Protocol. WAP 2.0 Technical White Paper. Aug. 2001. pp. 1-13.

Security in the WTLS. Whitepaper [online]. Oct. 1, 2000 Sami Jormalainen and Jouni Laine. [retrieved Sep. 11, 2001] Retrieved from the Internet: <URL: http://www.hut.fi/~jtlaine2/wtls/. pp. 1-21.

The Need of Security in WAP, WTLS: Wireless Transport Layer Security. [online] [retrieved on Sep. 25, 2001] Retrieved from the Internet: <URL: http://www.server49.hypermart .net/ieee-vesit/pubs/papers/wtls.htm pp. 1-17.

User Guide; Intel® NetStructure™ 7110/7115 e-Commerce Accelerator. Version 2.3; Jul. 28, 2000. Chapters 1-9 and Appendices A-C. p. 1-166.

Intel® NetStructure™ 7175 Traffic Director. E-Business traffic management that reduces errors. Product Data Sheet. pp. 1-2, 2000.

Intel® NetStructure™ 7280 XML Director. Intelligent management and reliability for key XML transactions. Reseller Sales Brief: What You Need to Know About the Intel® NetStructure™ 7280 XML Director. Product Data Sheet. pp. 1-2, 2000.

Intel® NetStructure™ 7140 Traffic Director. High performance, intelligent traffic management. Product Data Sheet. pp. 1-2, 2000.

Intel NetStructure: Accelerating Internet Commerce. Product Data Sheet. A Standish Group Research Note Copyright© 2000. pp. 1-4.

WAP Forum™ Relaeases WAP 2.0 Scecifications for Public Review. WAP 2.0 Integratees Latest Internet Standards and Content Technologies into Mobile Enviroment. Providing Platform for Richer Mobile Experience™. Mountain View, California—Aug. 1, 2001. pp. 1-5.

"Wireless Application Protocol Public Key Infrastructure Definition", Wireless Application Protocol Forum, Ltd., http://www.wapforum.org/, Version 24, Apr. 2001, pp. 1-46.

Wireless Application Protocol Forum, Ltd.: Wireless Application Protocol, Wireless Transport Layer Security Specification. WAP WTLS Version Nov. 5, 1999. URL.: http://www.wapforum.org/what/technical_1_2.htm (retreived on Jun. 16, 2010) 48 pgs.

Dierks, T.; Allen, C.: The TLS Protocol Version 1.0 Network Working Group, RFC 2246, Jan. 1999. URL: www.ietf.org/rfc/rfc2246.txt (retrieved on Jun. 16, 2010) 40 pgs.

* cited by examiner

SELECTING A SECURITY FORMAT CONVERSION FOR WIRED AND WIRELESS DEVICES

COPYRIGHT NOTICE

Contained herein is material that is subject to copyright protection. The copyright owner has no objection to the facsimile reproduction by anyone of the patent document or the patent disclosure, as it appears in the United States Patent and Trademark Office patent file or records, but otherwise reserves all rights to the copyright whatsoever. The following notice applies to the software and data as described below and in the drawings hereto: Copyright © 2001, Intel Corporation, All Rights Reserved.

BACKGROUND OF THE INVENTION

1. Field of the Invention

The invention relates generally to extending the capabilities of network security. More particularly, the invention relates to a system and method for selecting and performing different security format conversions in a data center based on security format information received from a network.

2. Background Information

Cell phones are often used to exchange sensitive personal and financial information over unsecure public networks. Accessing information from a financial account over the Internet is one example. Security solutions that encrypt data at the cell phone and transmit the encrypted data over the public networks have been devised to reduce the likelihood of an unintended recipient discovering the sensitive data. The goal is to provide end-to-end security between the cell phone user and a recipient. However this goal has been limited by a Wireless Application Protocol (WAP) gap wherein conversion from one security standard to another is performed within an untrusted intermediate WAP gateway that links the wireless access network to another public carrier network and renders the sensitive data unencrypted and vulnerable to attack even if only for a brief period of time.

FIG. 1 shows a system 100 that allows a cell phone 110 to exchange secure data with a server 170 subject to the limitations of a WAP gap 150. The cell phone 110 sends a Wireless Transport Layer Security (WTLS) encrypted request using either Wireless Datagram Protocol (WDP) or User Datagram Protocol (UDP) as a transport protocol to a wireless network 120. The request may include an access identification and password to access a financial account. The wireless network 120 receives the request and sends the request to a WAP gateway 130.

The WAP gateway 130 receives the request and includes a converter 140 to perform a first conversion 142 from either WDP or UDP to Transmission Control Protocol (TCP) and from WTLS to Secure Sockets Layer (SSL). During the conversion between WTLS and SSL, the secure data passes through an unsecured and vulnerable state that is susceptible to attack. Typically, the WAP gateway is owned and operated by a third party mobile operator. Leaving the sensitive data unencrypted in the hands of an unknown and untrusted third party is not a good practice. After the conversions the WAP gateway 130 sends the converted request to the Internet 160.

The Internet 160 receives the converted request and sends the converted request to the server 170. The server 170 receives the request in TCP and SSL format, converts from SSL format to a plain data format, and may run applicaton scripts such as CGI scripts 180 to access content 190 and generate an SSL encrypted response comprising the content 190. The server 170 uses TCP to transport the response in SSL format to the Internet 160. The Internet 160 receives the response and sends the response to the WAP gateway 130. The WAP gateway 130 performs a second conversion 144 from TCP to WDP and from SSL to WTLS. The WAP gateway 130 sends the converted response to the wireless network 120, which sends the response in WTLS encrypted format to the cell phone 110.

FIG. 2 further illustrates the vulnerability of data in a WAP gateway 200 having a WAP gap 250. The WAP gateway 200 receives WTLS encrypted data, which is conceptually represented by a WTLS security envelope 210. The WAP gateway 200 decrypts the WTLS data, which is conceptually represented by the open WTLS security envelope 220. Once decrypted, the data resides in the memory of the WAP gateway 200, at least for a brief period of time, as unsecure data that is in plain view 230. This vulnerability is known as the WAP gap 250. The WAP gateway 200 then encrypts the data in SSL format, as represented by the insertion of the data 230 into the open SSL security envelope 240 and subsequent sealing of the envelope 260. The SSL encrypted data, which is conceptually represented by the SSL security envelope 260 is provided to the Internet. As indicated by the bi-directional arrows, the WAP gap 250 may also be encountered when conversion is performed in the reverse direction from SSL to WTLS. Accordingly, as a result of the WAP gap 250 the data resides in a vulnerable, unsecured state that is under the untrusted control of the WAP gateway 200 and may be subjected to a man-in-the-middle attack.

FIG. 3 shows a prior art system 300 to avoid the WAP gap. A cell phone 310 exchanges WTLS data with a WAP gateway 320. The WAP gateway 320 sends the WTLS secure data to a trusted WTLS/SSL conversion system 330. The conversion system 330 resides at the same physical location as the WAP gateway 320 and is partially controlled by a party that controls the server 340. The WTLS/SSL conversion system 330 converts between WTLS and SSL by passing the data through an unsecured plain data state. Accordingly, this solution does not provide an end-to-end solution in which data is always in encrypted format. Also, although conversion in the WTLS/SSL conversion system 330 may be comparatively more trusted than conversion in the WAP gateway 320, the conversion system 330 resides at the physical location of the WAP gateway 320 and therefore the party of the server 340 does not have entirely trusted control of the conversion system 330. An additional disadvantage is the increased latency introduced by sending WTLS data to the WTLS/SSL conversion system 330 and awaiting responsive SSL data from the system 330. The WAP gateway receives the converted data in SSL encrypted format and provides the SSL encrypted data to the server 340 which runs CGI scripts to access data and format a response. The need to perform both a conversion from WTLS to SSL and then from SSL to plain data is yet another disadvantage of the system 300.

BRIEF DESCRIPTION OF THE SEVERAL VIEWS OF THE DRAWINGS

The novel features believed characteristic of the invention are set forth in the appended claims. The present invention is illustrated by way of example, and not by way of limitation, in the figures of the accompanying drawings and in which like reference numerals refer to similar elements. The invention itself, however, as well as a preferred mode of use, will best be understood by reference to the following detailed description of an illustrative embodiment when read in conjunction with the accompanying drawings:

DETAILED DESCRIPTION OF THE INVENTION

In the following description, for the purpose of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

Figure 4:
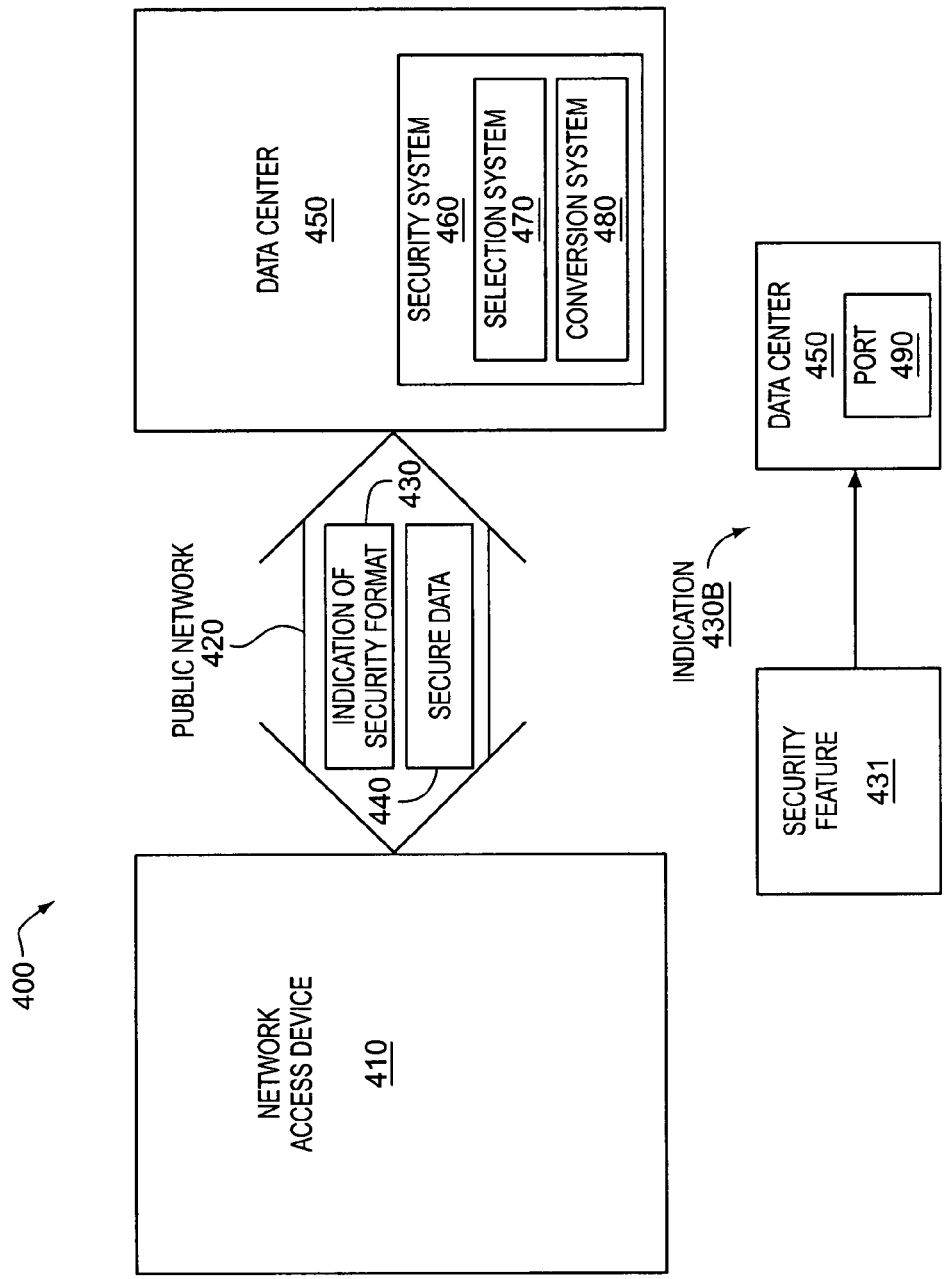
FIG. 4 shows a security system within a data center, according to one embodiment.

FIG. 4 shows a simplified block diagram of a secured communication system 400. As discussed herein, a system, such as a system for selecting a security format conversion, may be an apparatus including hardware, software, or some combination of hardware and software to process data. The system 400 includes a network access device 410 communicatively coupled with a data center 450 via a public network 420 to provide an indication of a security format 430 and secure data 440 to the data center 450. The data center 450 comprises a security system 460 having a selection system 470 to select a security conversion based on the indication 430 and a conversion system 480 to perform the selected security conversion on the secure data 440.

The network access device 410 may be any electronic device operable to connect with and transmit data over the network 420. For example, the access device 410 may include a wired device (e.g., a personal computer, workstation, or fax machine) or a wireless device (e.g., a laptop, personal digital assistant (PDA), mobile phone, pager, smartphone, or communicator). Typically wired devices use different security formats or protocols than wireless devices to take advantage of larger memory, processor, and bandwidth resources of the wireless device.

The public network 420 may be any network comprising at least a non-private portion that is shared by entities other than the network access device 410 and the data center 450. The public network 420 may be comparatively untrusted, unsecured, and more susceptible to a security breach during transfer (e.g., a man-in-the-middle attack) relative to a private network (e.g., an intranet) that may be used internally within the data center 450. According to one embodiment, the public network 420 includes a wireless network, a WAP gateway, and the Internet and provides end-to-end security between a wireless access device 410 and the data center 450.

The data center 450 may be any one or more computer systems connected with the public network 420 to receive or provide secure data over the public network 420. For example, the data center 450 may include a plurality of privately networked computer systems that provide such functions as a firewall, a server, and a data source.

The network access device 410 transmits the indication of a security protocol 430 to the data center 450 via the network 420. Different embodiments of the indication 430 are contemplated. According to a first embodiment the indication 430 includes information to request and define a connection between the network access device 410 and the data center 450.

According to a second embodiment the indication 430 includes an indication of a port for example a message associated with a particular security format received on a port configured to receive that particular security format. The term "port" will be used to refer to a logical linkage or interface between data received from the network 420 and a component of the data center 450 such as an application, module, or higher-level protocol. The port may have a corresponding port number that is assigned to the component and that may be used to link or direct data received from the network 420 with the component or service. According to one embodiment the port may comprise a well-known port having a well-known port number. For example, the port may be the well-known port 80 used for HTTP data or the port may be the well-known port 443 used for SSL data. A message received from the network 420 may include a port identifier that identifies the component. According to one embodiment a port may be implemented by an operating system directed software process that listens to data received from the network 420 on a physical interface, such as a network interface card (NIC) linked to the network with a gigabit Ethernet or RJ45 connection, for the port identifier that identifies the port and the component. The port identifier and an IP address together form a socket that specifies an endpoint of a connection. An end-to-end communication between the device 410 and the data center 450 may be specified by a four-tuple comprising a port and IP address of the device 410 and a port and IP address of the data center 450.

According to a third embodiment the indication 430 includes an indication of a security format supported by, preferred by or both supported and preferred by the network access device 410. For example, the indication 430 may comprise a security feature supported by or preferred by the access device 410 that is announced in a pre-data phase security negotiation message such as a client hello message sent during a security handshake. The term "security feature" will be used to broadly refer to features, parameters, and options that describe or define a security format and includes but is not limited to security features selected from the group comprising version information, option information (e.g., certification or no certification), encryption algorithm information, security parameter information, cryptographic parameter information, trusted certificate information, and other security feature information.

According to a fourth embodiment the indication 430 includes both an indication of a port associated with the security format and an indication of a security feature that is supported by the device 410. For example, exemplary indication 430B includes a security feature 431 provided to a port 490 (which may include well-known port 443) of the data center 450.

According to a fifth embodiment the indication 430 includes a session identification corresponding to a previous security format or conversion. According to a sixth embodiment the indication 430 includes a profile identification (e.g., a user identification and password) that allow access of a security format or security conversion from a profile in the data center 450. According to a seventh embodiment the indication 430 includes a dedicated unambiguous indication of a security format for example SSL version 3.0. According to a eighth embodiment the indication 430 includes a dedicated unambiguous indication of a security conversion for example logic or a module to convert from SSL version 3.0 to plain data. Many other embodiments of the indication 430 are contemplated and a person having an ordinary level of skill in the art and having the benefit of the present disclosure will appreciate that the indication 430 should be interpreted broadly.

As discussed above, different indications 430 are contemplated and the selection system 470 may accordingly make different selections. According to a first embodiment the selection is based on information received from the network 420. According to a second embodiment the selection is based on connection information associated with establishing a connection between the network access device 410 and the data center 450. According to a third embodiment the selection is based on port information. For example, the selection system 470 may select a first conversion if connection information is received at a first predetermined configured port and select a second conversion if connection information is received at a second port. According to a fourth embodiment the selection is based on security feature information indicating security format features that are supported, preferred or both supported and preferred by the device 410. For example, the selection system 470 may select a conversion based on a supported and preferred security format announced in a client hello message.

According to a fifth embodiment the selection may be based on port information and security feature information. For example, the selection system 470 may select a conversion from a security format based on a port that a client hello message is received upon and based on security features indicated in the client hello message to be supported and preferred by the client device 410.

According to a sixth embodiment, selection may be based on a session identification corresponding to a previous security format or conversion. According to a seventh embodiment selection may be based on a profile identification (e.g., a user identification and password) that allows the selection system 470 to access of a security format or security format conversion from a profile. According to an eighth embodiment, selection may be based on a stated security format or security format conversion (e.g., "SSL V3.0 to plain data"). Many other selections and selection systems 470 are contemplated and a person having an ordinary level of skill in the art and the benefit of the present disclosure will appreciate that selection and the selection system 470 should be interpreted broadly.

The conversion is from the received security format to another format. The other format may be a plain unencrypted data format. This may be advantageous when the data center 450 is sufficiently internally secure and provides sufficiently little risk of an unintended or unauthorized access to the data. Advantageously, this may avoid a subsequent decryption within the data center 450. According to an alternate embodiment, the other format may be a different security format. That is the security system 460 may select and implement a conversion from one security format to a different security format. For example, the conversion may be to IP security (IPSec), which may be desired for security within an intranet of the data center 450.

The network access device 410 transmits secure data 440 to the data center 450 via the network 420. The data center 450 receives the secure data 440 from the network 420. The conversion system 480 performs the selected security conversion on the secure data 440. Without limitation, the secure data 440 may be transactional and/or financial data and the data center 450 may use and/or respond to the data as desired for the particular implementation.

Figure 5:
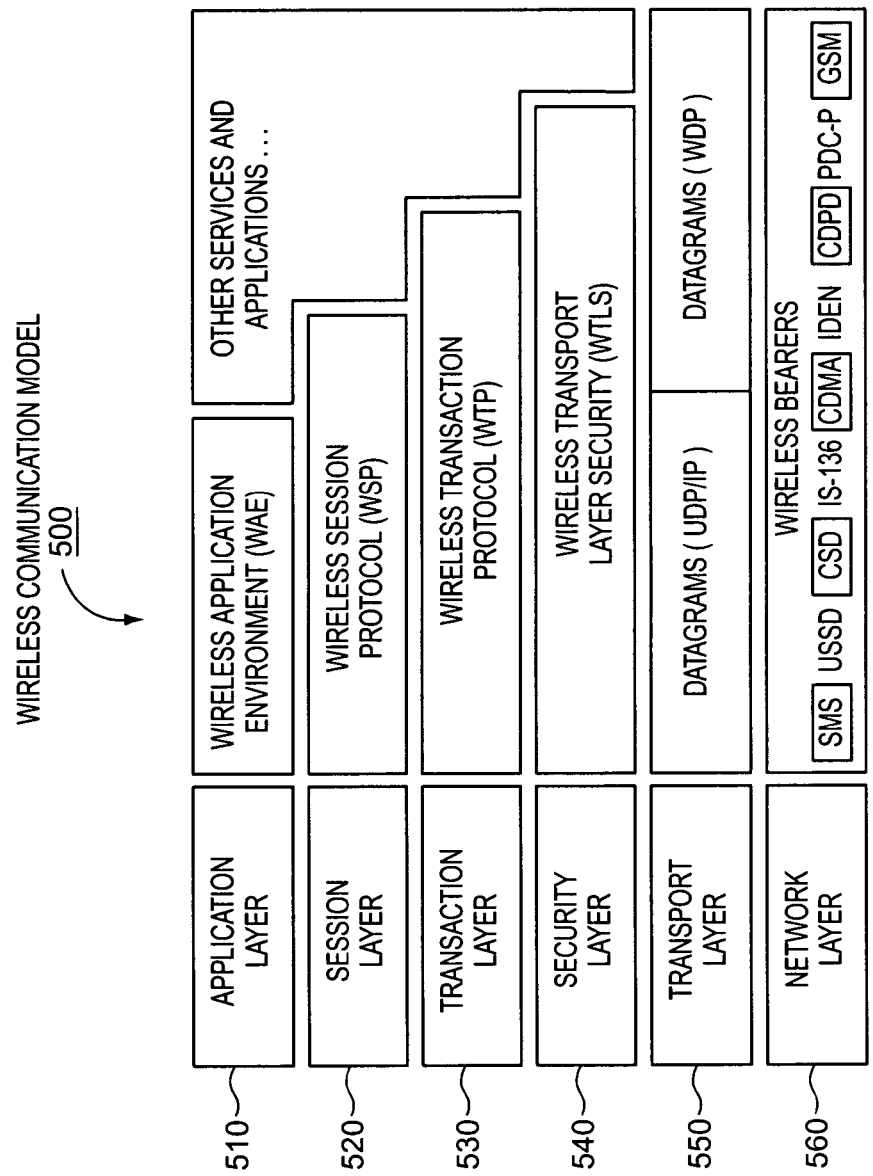
FIG. 5 shows a WAP stack, according to one embodiment.

According to one embodiment the network access device 410 is a wireless network access device that uses a WAP stack 500 shown in FIG. 5 to communicate with the data center 450. The WAP stack 500 is a secure specification that allows the wireless device to securely access information via the network 420. The WAP stack 500 includes an application layer 510, a session layer 520, a transaction layer 530, a security layer 540, a transport layer 550, and a network layer 560. The WAP stack 500 is well known to a person that has an ordinary level of skill in the art and is described in greater detail in versions 1.2 and 2.0 of the WAP specification.

The security layer 540 includes the WTLS protocol and may provide privacy, data integrity and client/server authentication for WAP enabled wireless devices. The WTLS protocol operates above the transport layer 550 and provides the upper level WAP layers 510-530 with a secure transport service interface that preserves the transport interface below and also presents methods to manage secure connections. WTLS is related to non-wireless protocols such as Secure Sockets Layer (SSL) but involves comparatively lower device side processing power and memory requirements, lower bandwidth, and datagram connection.

The transport layer 550 may include different datagram-based transport layer protocols such as UDP/IP and WDP. UDP operates with IP bearer services whereas WDP operates with non-IP bearer services. For example, WDP may be used with Short Message Service (SMS) and similar wireless bearer services whereas UDP may be used with Circuit Switched Data (CSD) and similar bearer services.

Figure 6:
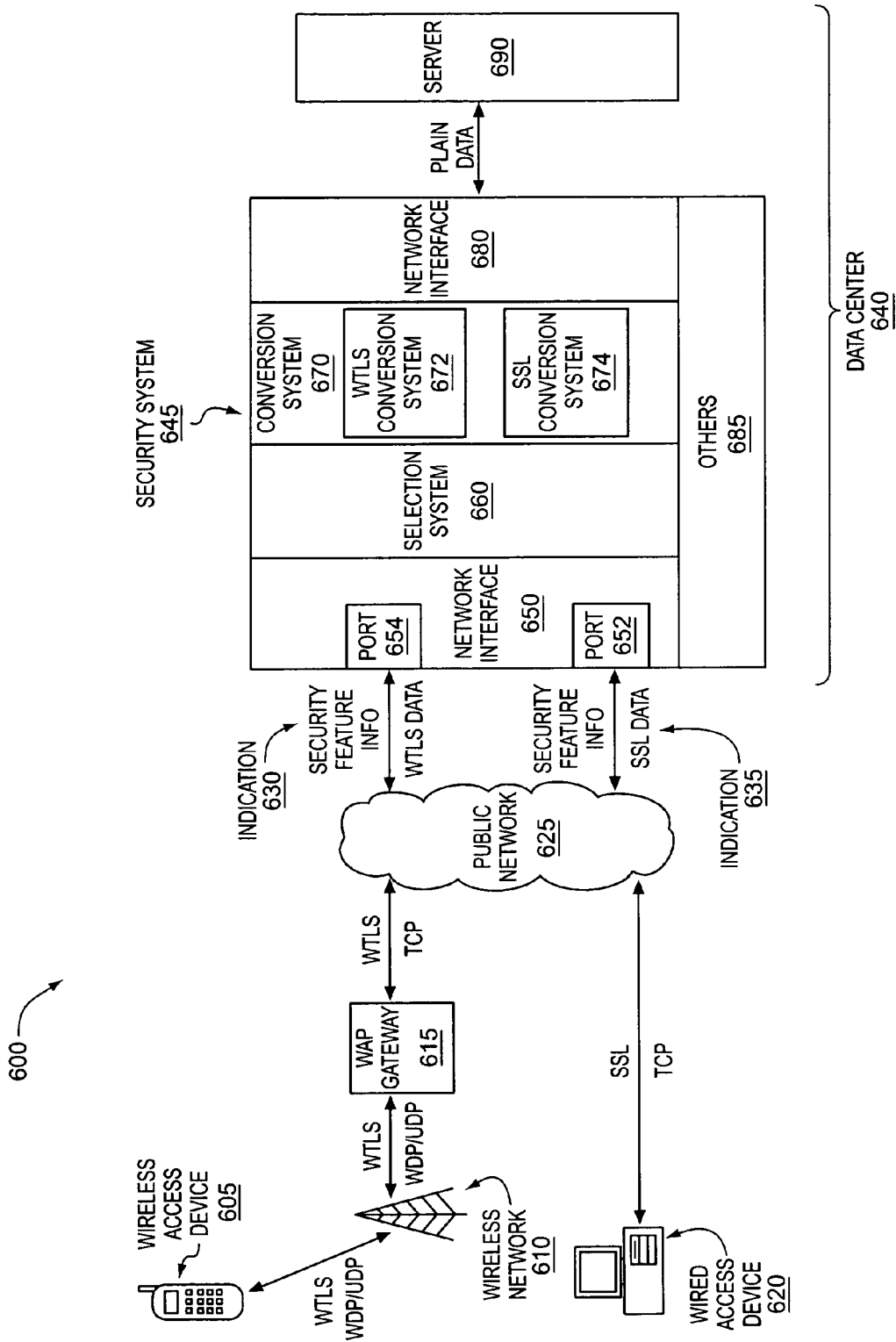
FIG. 6 shows a system architecture, according to one embodiment.

FIG. 6 shows a simplified block diagram of the system architecture 600 of one embodiment of the invention. The system architecture 600 includes a wireless access device 605 and a wired access device 620 to transmit heterogeneously encrypted messages through a public network 625 to a data center 640 comprising a security system 645 to select and implement different security conversion processing for the received heterogeneous encrypted messages.

The wireless access device 605, in one embodiment a WAP microbrowser enabled cell phone, is coupled to the public network 625, in one embodiment the Internet, via a wireless network 610 and WAP gateway 615. The wireless access device 605 generates and transmits a WTLS client hello message comprising security feature information corresponding to security capabilities and preferences of the device 605 to the wireless network 610 using either UDP or WDP transport protocol. The wireless network 610 receives the message and conveys it to the WAP gateway. The WAP gateway converts the transport protocol medium from either UDP or WDP to TCP and then passes the message to the public network 625 using TCP.

A wired access device 620, according to one embodiment a browser enabled personal computer, generates and transmits a message containing security feature information to the public network 625. The message may comprise an SSL client hello message used to initiate negotiation of a security format in an SSL handshake.

The public network 625 is functionally connected with the wireless access device 605, the wired access device 620, and the data center 640 to receive the messages from the devices 605, 620 and provide the messages to the data center 640. According to one embodiment, the network 625 includes the Internet and may use TCP or UDP as protocols for transport medium. The network 625 transmits or communicates the messages to the data center 640 as indications 630 and 635.

The data center 640 is coupled with the public network 625 to receive the messages associated with the devices 605 and 620. The data center 640 includes a security system 645 that according to one embodiment is functionally disposed between the public network 625 and a server 690 so that the security system 645 may perform security conversion selection and execution on behalf of the server 690.

According to one embodiment the security system 645 includes a network interface 650 to receive indications and secure data, a selection system 660 to select a conversion based on the indications, a conversion system 670 to receive the selected conversion and implement the selected conversion on secure data received via the network interface 650, and a second network interface 680 to receive converted data and provide the converted data to other data center 640 components such as in one embodiment a server 690.

The network interface 650 may include one or more NIC to receive the messages and secure data on behalf of the data center 640. According to one embodiment, the network interface 650 includes at least one port 654 to receive information from the wireless access device 605 and at least one port 652 to receive information from the wired access device 620. For example, the network interface 650 may include a first and second ports 654 to respectively receive secured and unsecured data from the wireless access device 605 and a second and third ports 652 to respectively receive secured and unsecured data from the wired access device 620.

The selection system 660 is coupled with the network interface 650 to receive security conversion selection information from the network interface 650 and select a security conversion based on the information. The security conversion may be a conversion from a security associated with the information to another format (e.g., another secured format or a plain data format). According to a first embodiment the selection system 660 selects a security conversion based on a received indication of a port. For example, the selection system 660 may receive an indication of a predetermined port known to be used for SSL encrypted data and select at least one security conversion from SSL encrypted format to another format. According to a second embodiment the selection system 660 selects at least one security conversion based on received security feature information. For example, the selection system 660 may receive security feature information indicating a security feature or set of security features that are supported by the wired access device 620 and select a conversion from that security to another format. According to a third embodiment the selection system 660 selects a conversion based on both port information and security feature information. For example, the selection system 660 may select either a WTLS conversion system 672 having at least one particular conversion from a WTLS format to another format or an SSL conversion system 674 having at least one particular conversion from an SSL format to another format based on the port information and may select either the particular WTLS or SSL conversion based on the security feature information.

The selection system 660 may provide the selected security conversion to other system 600 components. According to one embodiment, the selection system 660 associates a session identification for a session between a device 605 or 620 and the data center 640 with the selected security conversion. This may allow subsequently received data in secured format to be associated with the selected security conversion. In one embodiment, the selection system 660 may notify the conversion system 670 of the selected conversion by asserting a security conversion selection signal. For example, the selection system 660 may make a method call to the conversion system 670, the WTLS conversion system 672, or the SSL conversion system 674 conveying the selected conversion.

After a security format has been negotiated between the devices 605, 620 and the security system 645, the devices 605, 620 may transmit secure data to the security system 645. In particular, the wireless device 605 may transmit data in a predetermined version of WTLS. The wireless network 610 may receive the secure data and provide it to the WAP gateway 615. Typically the WAP gateway 615 will perform a conversion from either UDP or WDP to TCP and provide the TCP formatted data to the public network 625.

Figure 1:
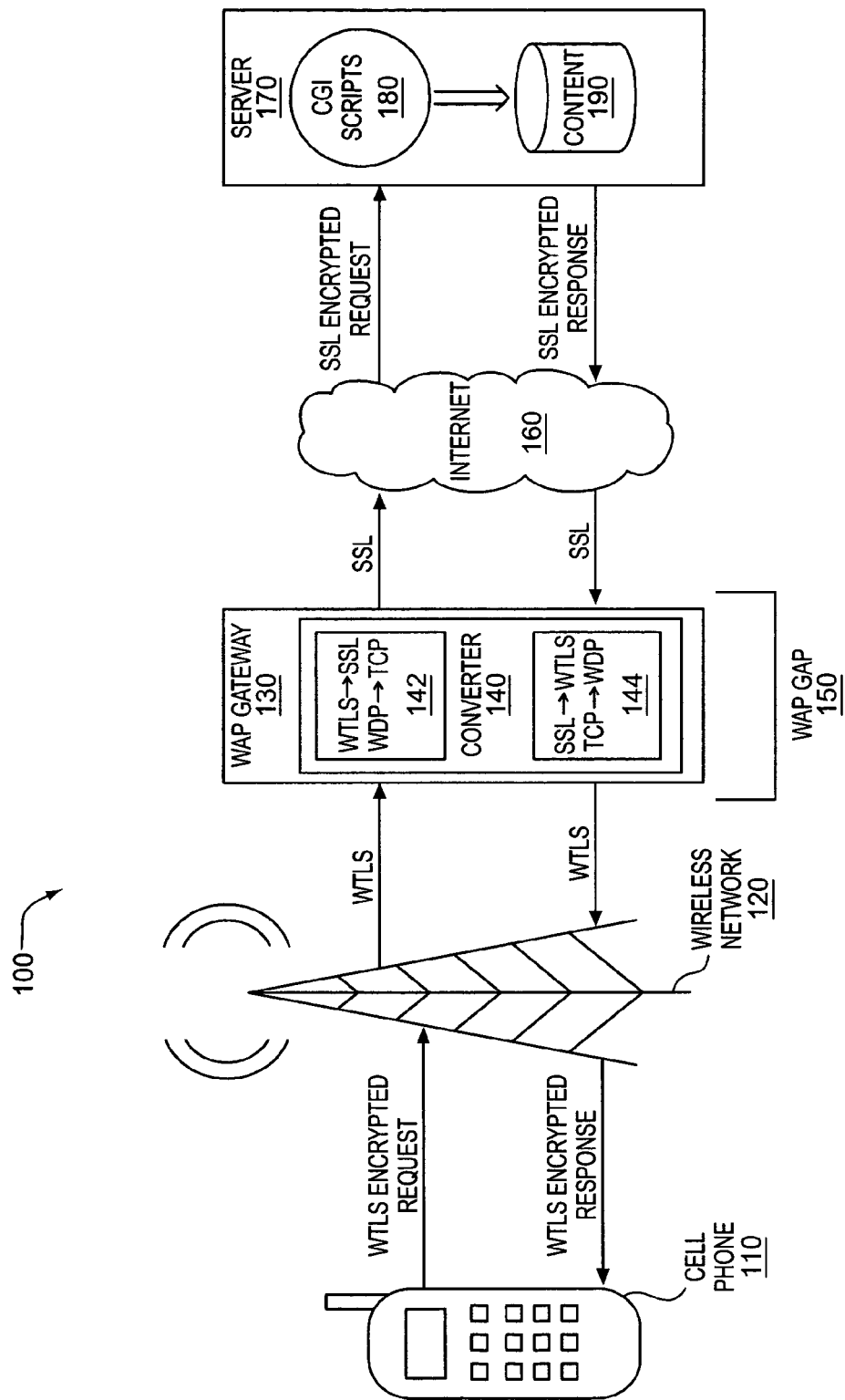
FIG. 1 shows a WAP gap that occurs at a WAP gateway when a cell phone attempts to exchange secure data with a server.
Figure 2:
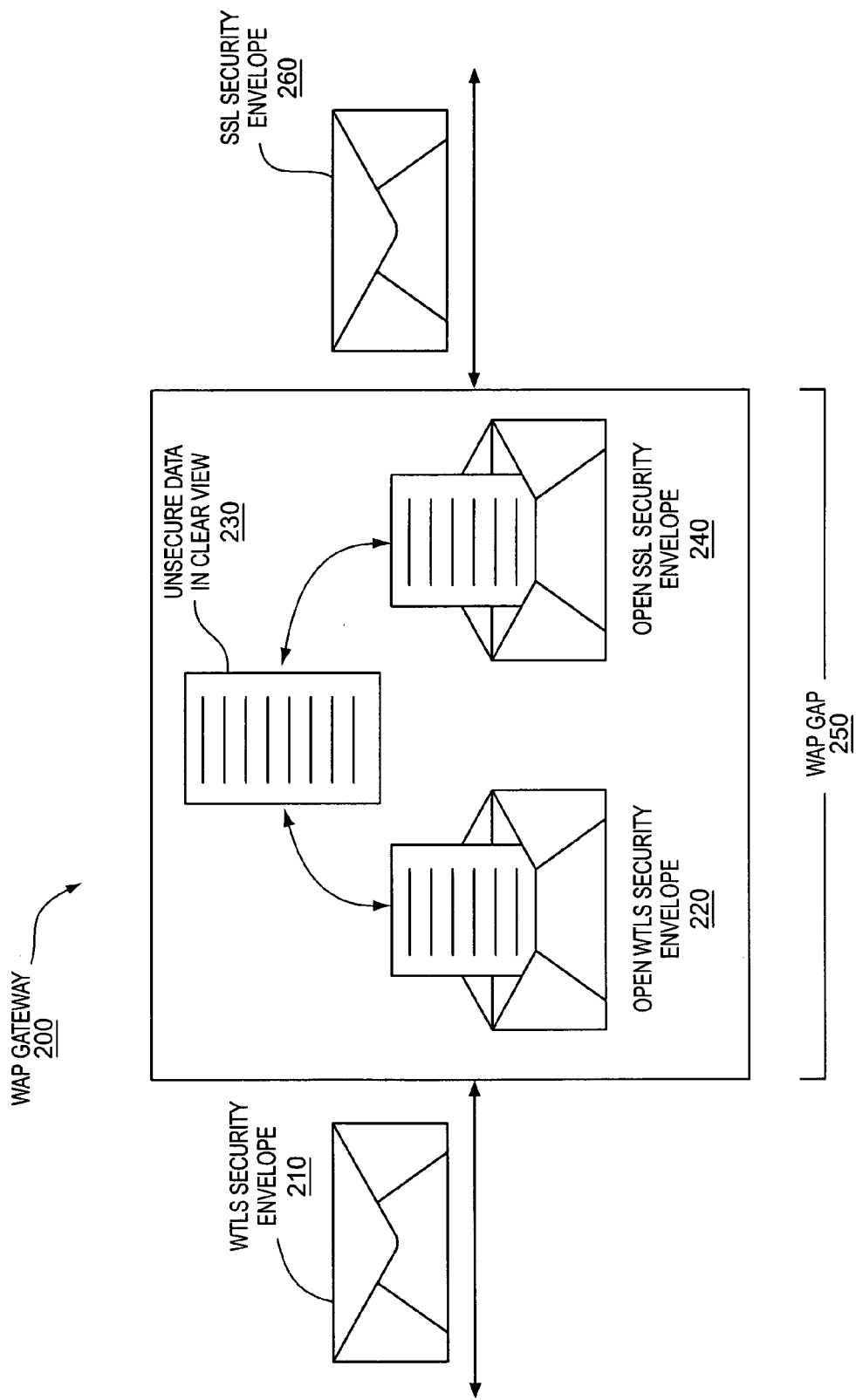
FIG. 2 shows data vulnerability within a WAP gateway due to the WAP gap.
Figure 3:
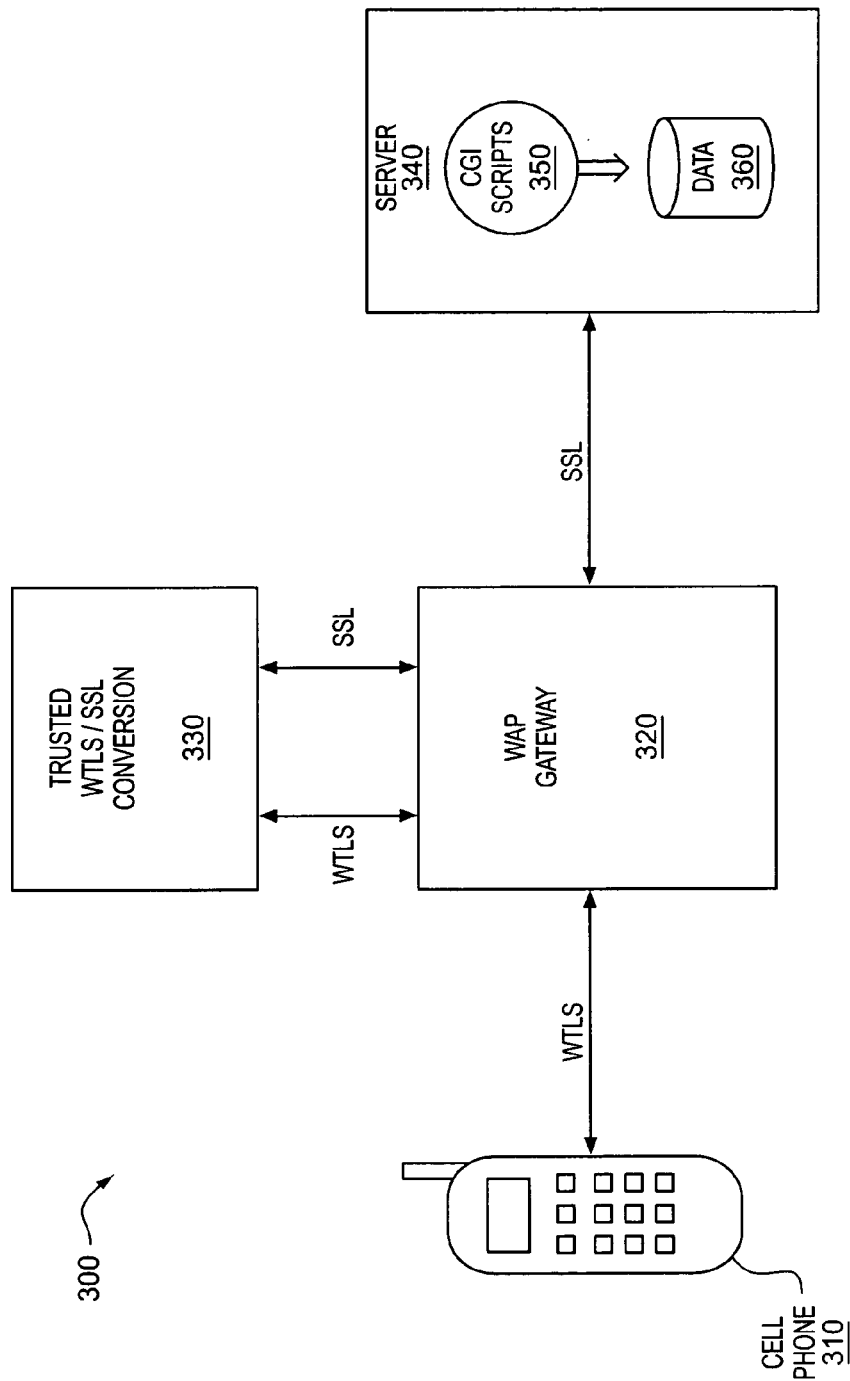
FIG. 3 shows WTLS/SSL conversion outside of the WAP gateway.

According to one embodiment the WAP gateway 615 is configured to let the received WTLS secure data pass though without security format conversion. Advantageously, this approach may provide end-to-end security between the wireless access device 605 and the data center 640 and may eliminate the WAP gap that exists when WTLS data is converted to SSL data via a vulnerable plain data state that is open to a man-in-the-middle attack. Different configurations are contemplated including one in which the WAP gateway 615 is configured to let all wireless connections to the data center 640 pass without security format conversion. This approach also provides reduced latency compared with the prior art approaches shown in FIGS. 1-3, since unnecessary security format conversion processing and transmission to and from the system 330 may be avoided.

The wired access device 620 may transmit data in a predetermined version of SSL that has been negotiated with the security system 645. The data may be transmitted in SSL format using TCP over the Internet 625.

The conversion system 670 is coupled with the selection system 660 to receive the selected security conversion and coupled with the network interface 650 to receive the secure data from the wireless device 605 and the wired device 620. The conversion system 670 implements the selected conversion on the received secure data. The conversion system 670 may include logic including software, hardware, or some combination of software and hardware to decipher the received secure data (e.g., WTLS or SSL encrypted data) into a plain unencrypted data format and if desired to re-encrypt into an alternate security protocol format. According to one embodiment the logic may include conventional conversion logic that is well known to a person having an ordinary level of skill in the art and the benefit of the present disclosure.

As stated, the security system 645 may include different conversion modules to perform conversion from a received security format to another format. According to one embodiment, the conversion system 670 includes a WTLS conversion system 672 and an SSL conversion system 674 to convert WTLS or SSL secure data, respectively, into a different security format. The WTLS conversion system 672 may include a plurality of conversion modules, for example, a first conversion module from a first version of WTLS having a first security feature to plain data, a second conversion module from a second version of WTLS having a second security feature to plain data, and a third conversion module from the first version of WTLS to another secured format such as SSL, IPSec, or others. Similarly, the conversion system 674 may have a plurality of conversion modules.

The conversion system 670 provides converted data to a network interface 680 that is coupled with the server 690. The network interface 680 may include a NIC. Typically the network interface 680 provides plain data to the server 690 via a plain data port, such as port 80, although other embodiments are contemplated.

The server 690 receives the converted data. If the converted data is in a secured format the server 690 may perform deciphering. Without limitation, the server 690 may perform any processing that is desired for the particular implementation. Typically, the processing will include providing responsive data to the devices 605, 620 via the security system 645. According to one embodiment the server 690 provides plain data to the security system 645.

The security system 645 may receive the responsive data and perform security processing on the data. According to one embodiment the security system 645 processes the responsive data by a substantial reversal of the initial conversion. For example, for responsive data to the wireless device 605 the security system 645 may convert plain data from the server 690 to WTLS format and provide the secure data to the wireless device 605. Similarly, for responsive data to the wired device 620 the security system 645 may convert plain data from the server 690 to SSL format and provide the secure data to the wired device 620.

The system 600 may offer a number of advantages. A first advantage may be an ability to off-load security processing functions from the server 690 to the security system 645. Security processing may be quite processor and memory intensive and may consume a significant portion of the resources of the server 690 without such off-loading. Off-loading may also allow the server 690 to handle more connections. For example, with a security system 645 that performs security conversion the server 690 may be able to handle approximately 5-10 times the number of connections as without. A second advantage is end-to-end security between the access devices 605, 620 and the server 690. A third advantage is a single security conversion between the access devices 605, 620 and the server 690. This may provide a faster exchange of data due to less computation and less latency. A fourth advantage is that the security system 645 may provide a single point security solution for both wireless and wired security protocols. A fifth advantage is that frequently it may be easier to update the security system 645 with the most current security standards and conversions rather than updating the server 690.

The security system 645 has been shown in simplified format so as not to obscure the invention. However, those having an ordinary level of skill in the art and the benefit of the present disclosure will appreciate that other components 685 may be included in the security system 645. Frequently the other components 685 will include an operating system or platform. The other components 685 may also include components that may be desired for the particular implementation such as components to perform XML transformation, XML parsing, content based routing, and other plain data functions. The other components 685 may include a component used in a conventional dedicated security accelerator such as an Intel® NetStructure™ 7110 e-Commerce Accelerator, a 7115 e-Commerce Accelerator, a 7140 Traffic Director, a 7175 Traffic Director, a 7180 e-Commerce Director, a 7280 XML Director, or a 7210 XML Accelerator, which are each available from Intel corporation of Santa Clara, Calif.

Figure 7:
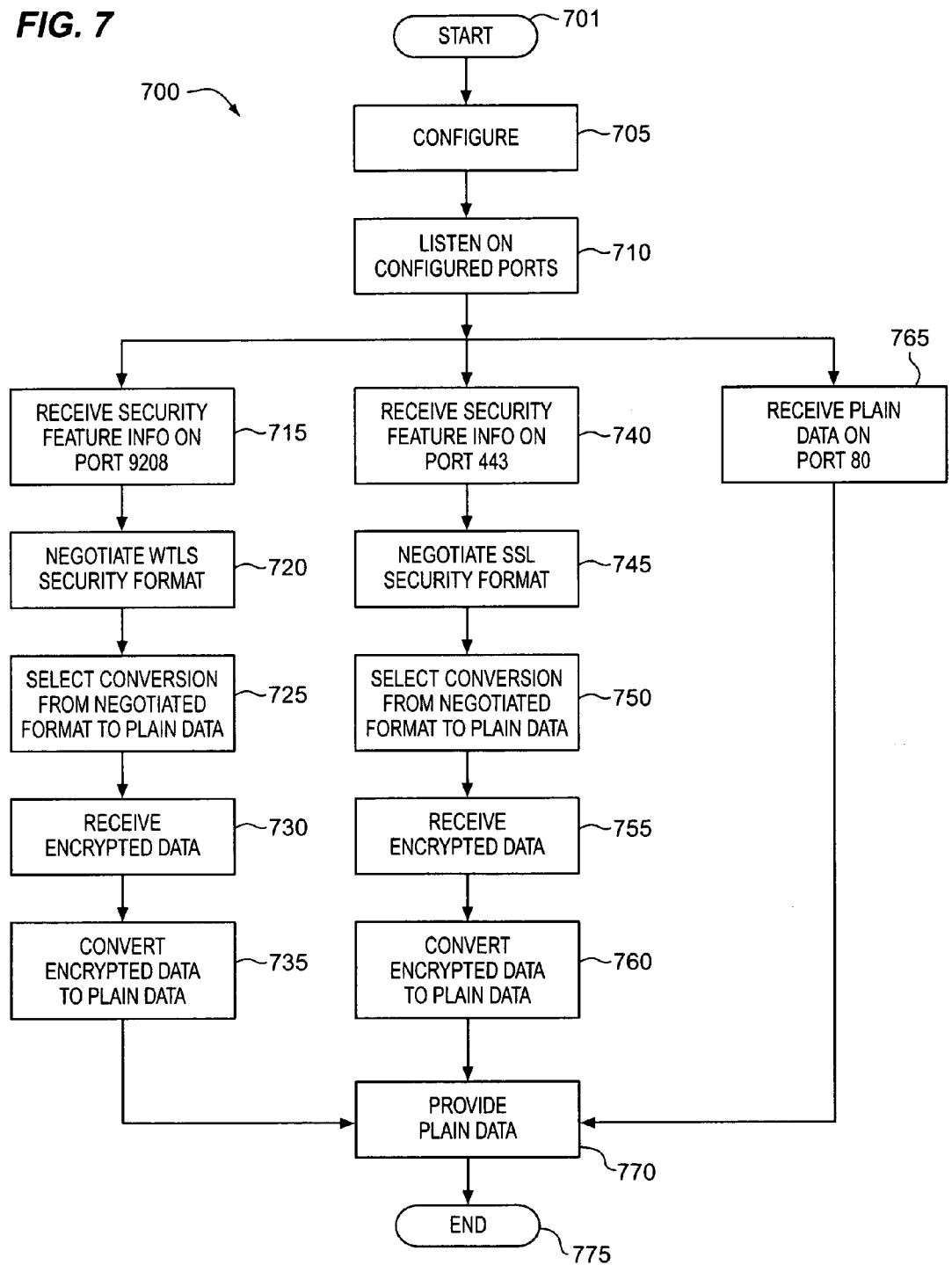
FIG. 7 shows a method for operating a security system, according to one embodiment.

FIG. 7 illustrates in block diagram form a method 700 for operating a security system, such as security system 460 or 645, according to one embodiment. The method 700 may be implemented in logic that may include software, hardware, or a combination of software and hardware.

The method 700 commences at block 701 and then proceeds to block 705 where the security system is configured. According to one embodiment this may include reading a configuration file containing system configuration information. For example, without limitation the security system may access configuration information such as contained in the following table:

TABLE 1

| MAP ID | CONNECT TYPE | KEY ID | SERVER IP | NET PORT | SERVER PORT | CIPHER SUITES | RE-DIRECT |
|---|---|---|---|---|---|---|---|
| 1 | WTLS | WAPSRV | 10.1.1.30 | 9208 | 80 | LOW | YES |
| 2 | SSL | HTTPSRV | 10.1.1.31 | 443 | 80 | MED | YES |
| 3 | HTTP/PLAIN | NONE | 10.1.1.31 | 80 | 80 | NONE | NO |
| 4 | WAP/PLAIN | NONE | 10.1.1.30 | 80 | 80 | NONE | NO |

In the above table the map ID provides an arbitrary identifier for a connection, the connection type provides a type of the connection either secured or unsecured, the key ID provides key identifications to use for the secured connection, the server IP provides an Internet Protocol address to communicate with servers in the data center, the network port provides predetermined known port numbers to receive secured or unsecured data from a public network, the server port provides a well known predetermined port to communicate plain data to the servers in the data center, the cipher suites contains an indication of security strength used for the secured and unsecured connections, and the redirect provides an option to redirect an access device to security upgrade resources in the event the device does not support the used security features.

Consider without limitation the following exemplary implementation of the redirect feature. The security system determines whether the client meets the security level specified in the configuration. If the client does not meet the specified security level the security system may determine whether a redirect page should be sent as a Uniform Resource Locator (URL) to present an opportunity for the client to upgrade to the specified security level. If the redirect page is not to be sent a default error message may be sent instead.

Alternatively, rather than using separate servers the same server may be used to serve both HTML and Wireless Markup Language (WML) content on different net ports such that the server IP net port combination is unique. For example, the security system may use configuration information such as contained in the following table:

TABLE 2

| MAP ID | CONNECT TYPE | KEY ID | SERVER IP | NET PORT | SERVER PORT | CIPHER SUITES | RE-DIRECT |
|---|---|---|---|---|---|---|---|
| 1 | WTLS | WEBSRV1 | 10.1.1.32 | 9208 | 80 | LOW | YES |
| 2 | SSL | WEBSRV2 | 10.1.1.32 | 443 | 80 | MED | YES |
| 3 | PLAIN | NONE | 10.1.1.32 | 80 | 80 | NONE | NO |

The method 700 advances from block 705 to block 710 where processes listen on the configured ports for activity or messages. According to one embodiment the processes listen on unique sockets comprised of a unique combination of an IP address and a port. According to one embodiment the security system spawns separate processes or threads to listen on the ports identified in the configuration file. For example a process may listen on port 9208 for WTLS related messages, a process may listen on port 443 for SSL related messages, and a process may listen on port 80 for unsecured data.

The method 700 may advance from block 710 to block 715 if security feature information is received on port 9208. According to one embodiment, the security feature information may include a client hello message from a wireless access device. For example, the security feature information may include a client hello message for an existing or future version of WTLS.

The method 700 advances from block 715 to block 720 where a WTLS security format is negotiated. The negotiation may be based on security feature information that indicates security features that the wireless device prefers or is operable to use. The negotiation may include a back-and forth exchange of security feature capabilities and/or preferences between the access device and the data center to agree upon a mutually supported security format. According to one embodiment the negotiation of block 720 includes a WTLS handshake protocol. Different embodiments of the negotiated security format are contemplated. According to a first embodiment the security format includes an existing or future version of WTLS. According to a second embodiment the security format includes a negotiated security feature such as a cryptographic parameter, a cryptographic algorithm (e.g., Data Encryption Standard (DES)), or both.

The method 700 advances from block 720 to block 725 where a conversion from the negotiated security format to an unencrypted plain data format is selected. Conversion to plain data format may be advantageous in architectures where the security system is coupled with a data destination (e.g., data center server) by a sufficiently trusted connection or network, since the server may then receive plain data and not perform deciphering.

According to a first embodiment, the conversion is selected based on reception of information on port 9208. For example, the conversion may be selected based on information associated with block 715. According to a second embodiment, the conversion is based on a security negotiation. For example, the conversion may be selected based on information associated with block 720. The selected security conversion may be communicated to other components such as a conversion system or a conversion module.

The method 700 advances from block 725 to block 730 where secure encrypted data is received. The secure data may be received over port 9208 and may be in the negotiated security format of block 720. The method 700 advances from block 730 to block 735 where the received encrypted data is converted to plain data. This may be done using conventional or well-known methods. Blocks 730 and 735 may be implemented using a batch or continuous mode.

The method 700 may advance from block 710 to block 740 if security feature information is received on port 443. For example, the security feature information may be associated with a connection https://www.intel.com that indicates to the data center that the client device will try to connect to port 443. According to one embodiment, the security feature information may include a client hello message from a wired access device. For example, the security feature information may include a client hello message for an existing or future version of SSL.

The method 700 advances from block 740 to block 745 where an SSL security format is negotiated. The negotiation may be performed in analogous fashion to that described for block 720 to determine a security format that may be based on SSL and that may include and SSL cryptographic parameter and SSL algorithm.

The method 700 advances from block 745 to block 750 where a conversion from the negotiated security format to an unencrypted plain data format is selected. According to a first embodiment, the conversion is selected based on reception of information on port 443. For example, the conversion may be selected based on information associated with block 740. According to a second embodiment, the conversion is based on a security negotiation. For example, the conversion may be selected based on information associated with block 745.

The method 700 advances from block 750 to block 755 where data in the negotiated security format is received at port 443. The method 700 advances from block 755 to block 760 where the received data is converted from the secure format to a plain data format.

The method 700 may advance from block 710 to block 765 if plain unencrypted data is received on port 80.

The method 700 may advance from block 735, 760, or 765 to block 770 where plain data is provided to a desired destination. According to one embodiment the data is provided to a server or other computer system of the data center. The server may be identified by a network address in configuration information. According to one embodiment the data is provided to the server over well-known port 80. The method 700 may terminate at block 775.

Alternate embodiments of the method 700 are contemplated. According to a first alternate embodiment, different ports are configured and used. Typically the ports for receiving security feature information and data will conform to designations by the Internet Assigned Numbers Authority (IANA) or a similar authority. According to one embodiment, the WTLS port may be a port selected from the group of ports having numbers between 9208 and 9282. According to a second alternate embodiment, a security conversion from the negotiated format of blocks 720 or 745 may be selected to another security format rather than to a plain data format. This may be advantageous when the data destination is coupled with the security system by a link that is not sufficiently secure. For example, rather than providing plain data at block 770 the secure data in WTLS format may be converted to secure data in SSL format and provided to the data destination. Such a conversion may be advantageous when the data destination is unable to decipher the pre-conversion security format.

Figure 8:
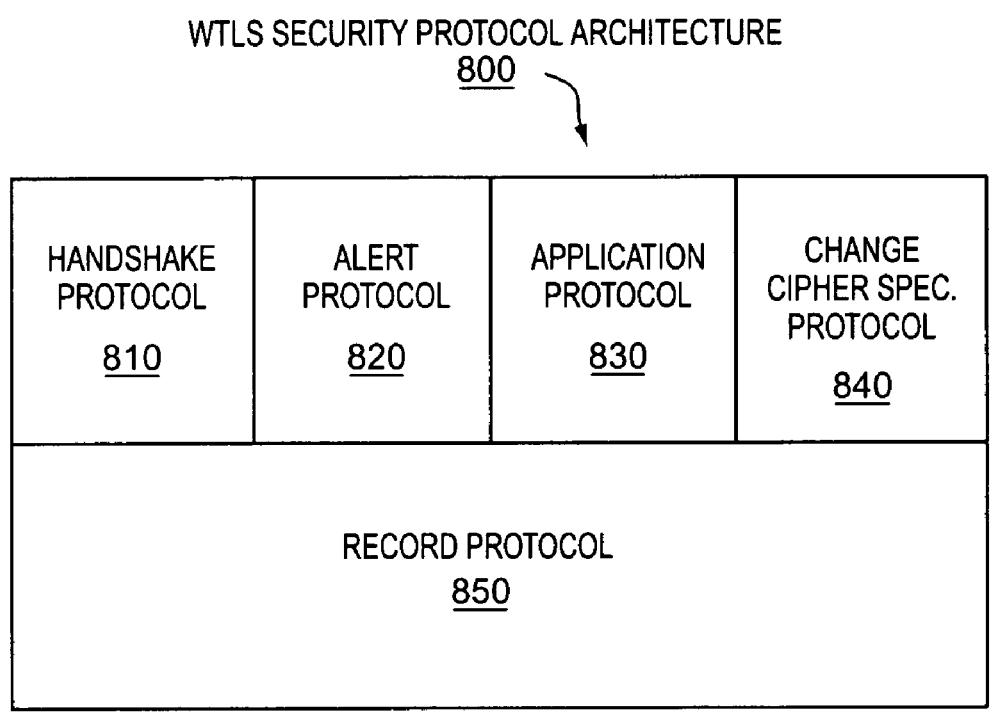
FIG. 8 shows a WTLS security protocol architecture, according to one embodiment.

FIG. 8 shows WTLS security architecture 800, according to one embodiment. The architecture 800 includes a record protocol 850 to accept unsecured data from upper stack layers to be transmitted, take care of data integrity and authentication, and apply compression and encryption algorithms to the data. The architecture 800 also includes four protocol clients including a handshake protocol 810 as discussed below, an alert protocol 820 to provide ways to terminate secure connections, an application protocol 830 to interface with upper stack layers, and a change cipher spec protocol 840 to allow coordinated changing between read, write, and pending states.

The handshake protocol 810 represents one embodiment of a security negotiation between a wireless access device and a data center. The handshake protocol 810 allows the device and the data center to negotiate or agree upon security methods and parameters such as a security protocol, protocol version, cryptographic algorithm, authentication, public key technique, and other security features.

Figure 9:
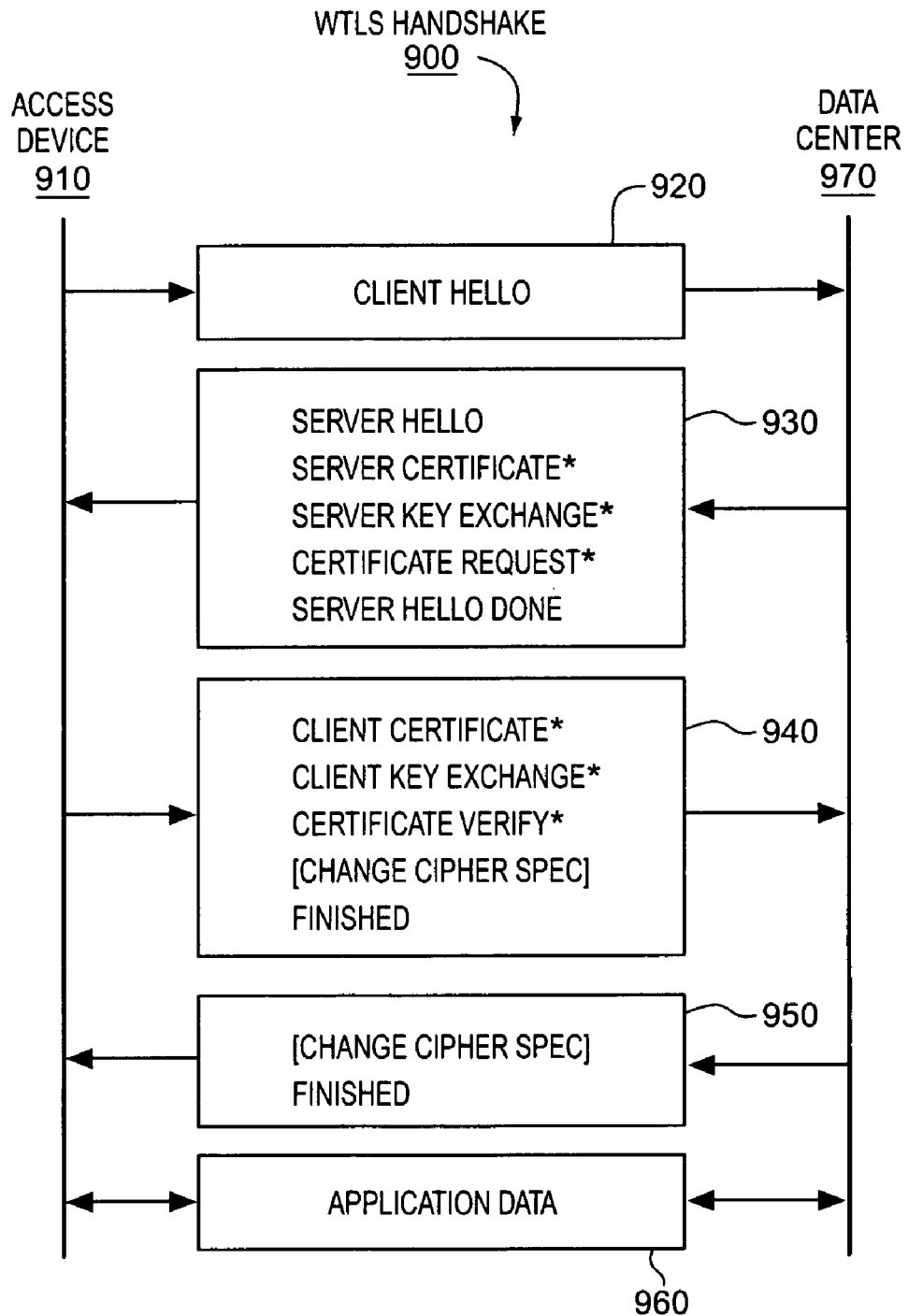
FIG. 9 shows a WTLS handshake, according to one embodiment.

FIG. 9 shows a block flow diagram of a WTLS handshake 900, according to one embodiment. The handshake 900 may be used to negotiate a security format between a wireless access device client 910 and a data center server 970. According to one embodiment the handshake 900 comprises security feature information.

The handshake 900 begins by the client 910 providing a client hello message to a data center 970 at block 920. The client hello typically announces supported security features (e.g., protocols, versions, options, encryption algorithms, and trusted certificates). According to one embodiment the client hello at least partially indicates a security format. After the client hello the access device client 910 receives messages until the data center server 970 sends a server hello done message.

The handshake 900 advances from block 920 to block 930 where the data center server 970 continues the handshake 900. The data center server 970 may provide a server hello message that agrees or renegotiates the security format method and parameters. The server 970 may also send a server certificate message if authentication is to be used, a server key exchange message to provide a public key that may be used to conduct or exchange a pre-master secret value, a certificate request message to ask the client for a certificate and authentication, and a server hello done message to indicate that the hello-message phase of the handshake 900 is complete. The server 970 then awaits a response from the client 910.

The handshake 900 advances from block 930 to block 940 where the access device client 910 continues the handshake 900. The client 910 may send a client certificate message if requested to authenticate itself (or a no certificate alert), a client key exchange message based on the public key algorithm selected between the client hello and the server hello and comprising a pre-master secret encrypted with the data center server's public key, a digitally-signed certificate verify message to explicitly verify the certificate if the client 910 has sent a certificate with signing ability, a change cipher spec message to indicate to start using the negotiated security parameters, and a finished message comprising verification of previous data including calculated security information under the new algorithms, keys, and secrets.

The handshake 900 advances from block 940 to block 950 where the data center server 970 continues the handshake 900. The data center server 970 may respond with a cipher spec message to confirm the session and inform the client 910 to use the negotiated session parameters, and a finished message that includes verification of exchanged and calculated information.

The handshake 900 advances from block 950 to block 960 where the client 910 and server 970 may exchange secure data using the established and negotiated secure connection. The handshake 900 may also include preserving information about the secure connection, such as a session identifier, so that future secure data exchange may be based on previously negotiated security methods and parameters.

Figure 10:
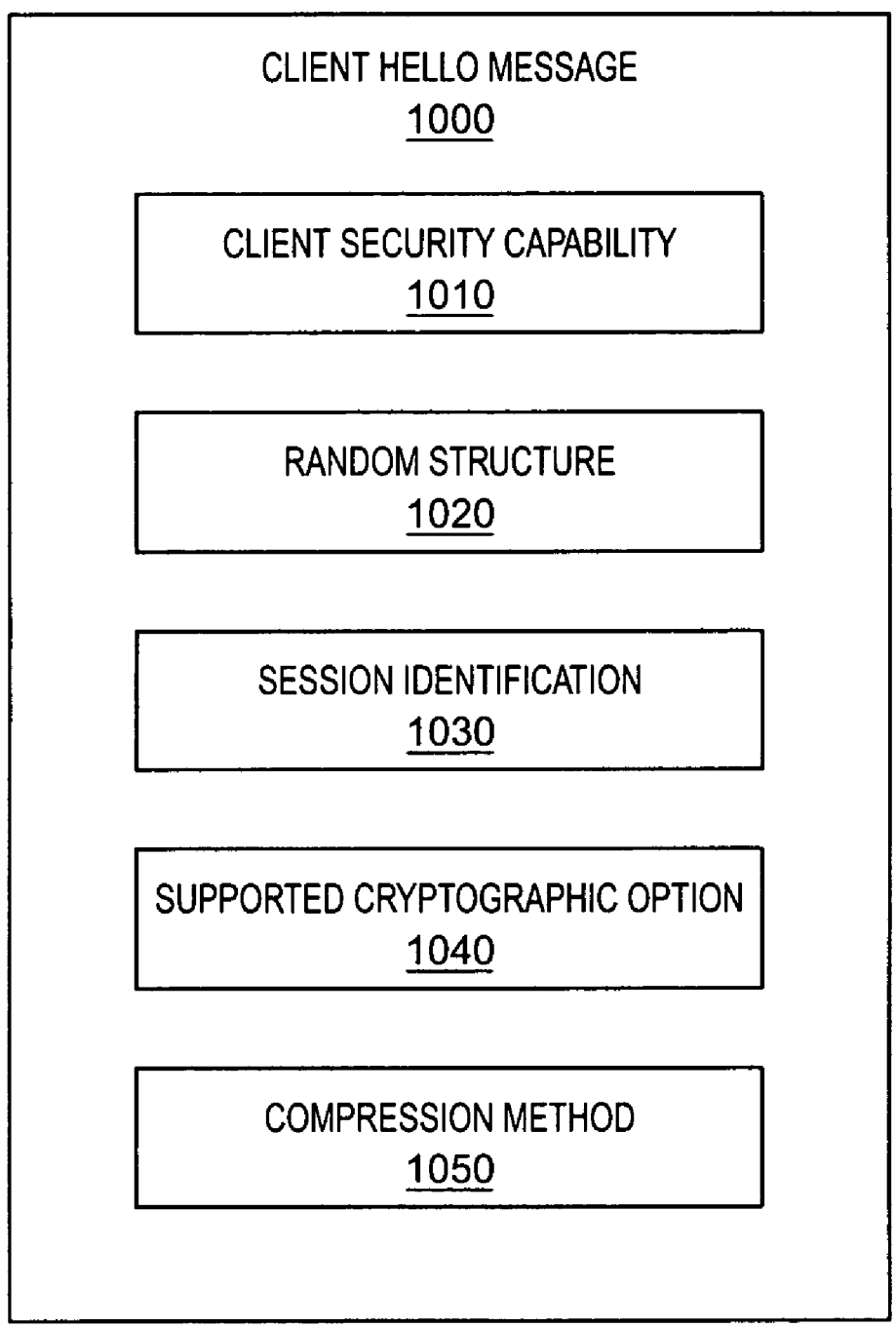
FIG. 10 shows a client hello message, according to one embodiment.

FIG. 10 shows a client hello message 1000, according to one embodiment. The client hello message 1000 may be for SSL, WTLS, or for another security format. According to one embodiment, the client hello message 1000 received on a port comprises an indication of a security format. The client hello message 1000 includes security feature information such as client security capability information 1010, random structure information 1020, session identification information 1030, supported cryptographic option information 1040, and compression method information 1050.

The client security capability information 1010 may include a protocol version. The protocol version may be a version the client is operable to use, desires to use, or both. For example, the information 1010 may indicate SSL version 3.0 or another protocol version. According to one embodiment, a security system in a data center may use the client version information to negotiate a security format and select a corresponding security conversion.

The random structure information 1020 may include a client-generated random structure. The random structure may include a plurality of bits based on the current time and date according to an internal clock of the client and a plurality of random bytes that are generated by a security random number generator.

The session identification information 1030 may include a variable length session identification that if not empty identifies a prior session between the client and the server including prior security methods and parameters that the client wishes to reuse for the current session. The session identification may be from an earlier connection, this connection, or another currently active connection. The server may define the actual contents of the session identification. The session identification information 1030 may be empty if a prior session is not available or if the client wishes to renegotiate security methods and parameters. According to one embodiment a session identification comprises an indication of a security conversion. For example, a session identification may correspond to a previously selected security conversion and receipt of the session identification allows a selection system to reselect the security conversion.

The supported cryptographic information 1040 may include an indication of cryptographic options and combinations supported by the client and arranged according to the client's preference. This may also include similar information from prior sessions that are to be reused.

The compression method information 1050 may include a list of compression algorithms or methods supported by the client and an indication of client preference for each method. If the session identification information 1030 indicates a session to reuse, the compression method information 1050 may include a compression method used for the prior session. According to one embodiment, the information 1050 indicates support for CompressionMethod.null.

Figure 11:
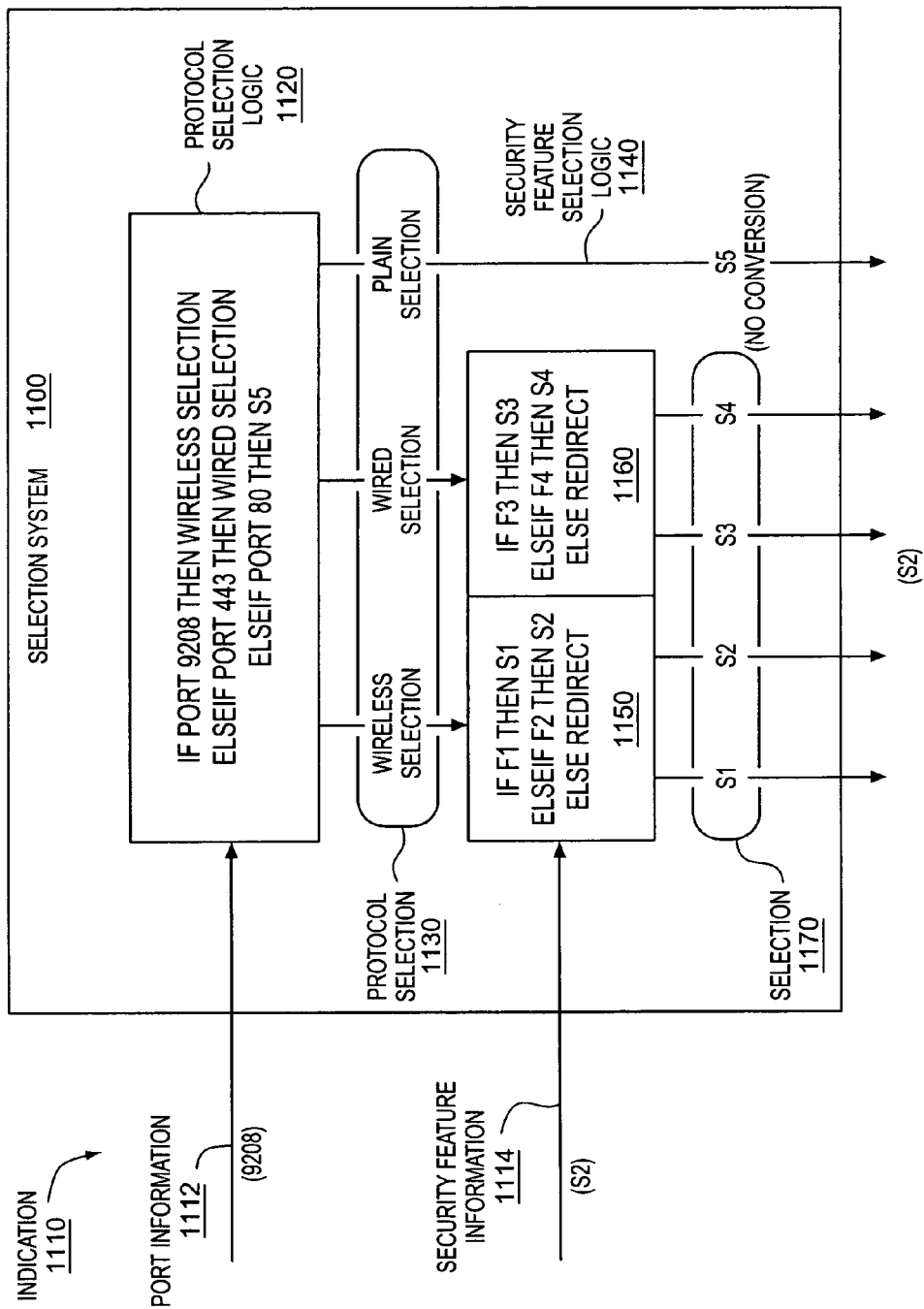
FIG. 11 shows security system, according to one embodiment.

FIG. 11 shows a selection system 1100 of one embodiment. The selection system 1100 receives an indication 1110. The indication 1110 is an indication sufficient to allow the selection system 1100 to select a security format conversion. The shown indication 1110 includes an indication of a security format and has port information 1112 and security feature information 1114.

The port information 1112, which may include an indication of a port that data (e.g., client hello messages, security feature information, etc.) was received upon, is provided to protocol selection logic 1120 of the selection system 1100. The protocol selection logic 1120 is operable to select between different security protocols based on the port information 1112. According to the shown embodiment the protocol selection logic 1120 is operable to select between a wireless protocol, a wired protocol, and a plain unsecured protocol based on the port information 1112. Without limitation, consider the following conceptual protocol selection logic 1120: if the port information 1112 indicates port 9208 then select a wireless protocol; otherwise if the port information 1112 indicates port 443 then select a wired protocol; otherwise if the port information 1112 indicates port 80 then select a plain unsecured protocol. The protocol selection logic 1120 asserts a protocol selection 1130 that indicates either the wireless protocol (wireless selection), the wired protocol (wired selection), or the plain unsecured protocol (S5).

The selection system 1100 also comprises security feature selection logic 1140 coupled with protocol selection logic 1120 to receive the protocol selection 1130. The logic 1140 is operable to select different security format conversions based on the protocol selection 1130 and based on the security feature information 1114. The selection S5 may bypass the logic 1140 since a security format conversion will usually not be performed on plain data. According to the shown embodiment, the logic 1140 is operable to select one of four different conversions (i.e., corresponding to selections S1, S2, S3, or S4), although this is not a limitation of other embodiments.

The logic 1140 comprises a wireless logic portion 1150 and a wired logic portion 1160 both able to receive the security feature information 1114. The logic portion 1150 is operable to select a conversion if the protocol selection 1130 indicates a wireless selection. Without limitation, consider the following conceptual logic portion 1150: if the security feature information 1114 indicates a set F1 of at least one security feature then select a first security format conversion; otherwise if the security feature information 1114 indicates a set F2 of at least one security feature then select a second security format conversion; otherwise send a redirect URL if so configured.

The logic portion 1160 is operable to select a conversion if the protocol selection 1130 indicates a wired selection. Without limitation, consider the following conceptual logic portion 1160: if the security feature information 1114 indicates a set F3 of at least one security feature then select a third security format conversion; otherwise if the security feature information 1114 indicates a set F4 of at least one security feature then select a fourth security format conversion; otherwise send a redirect URL if so configured.

The logic 1140 asserts a security format conversion selection 1170 that indicates a security format conversion to perform on secure data that is consistent with the port information 1112 and the 1114. The selection 1170 may include S1 or S2 for a wireless device and S3 or S4 for a wired device. The selection 1170 may be communicated to a conversion system or module.

Figure 12:
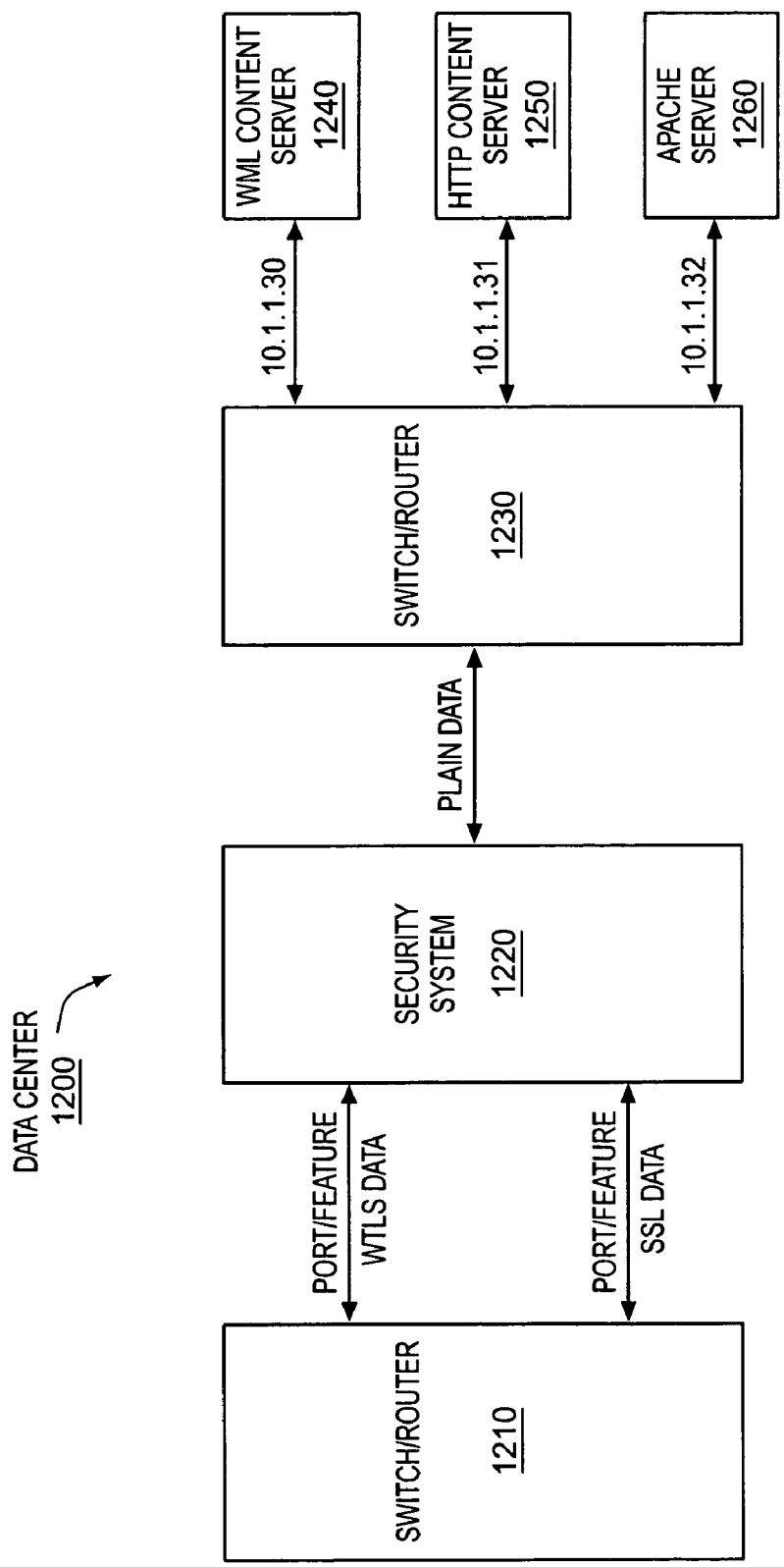
FIG. 12 shows architecture of a data center, according to one embodiment.

FIG. 12 shows a data center 1200, according to one embodiment. The data center 1200 may be coupled with a public network such as the Internet to receive indications and secure data from the public network. The data center 1200 includes a security system 1220 functionally disposed between a switch/router 1210 and a switch/router 1230 and sufficiently proximate to one or more servers 1240-1260 of the data center 1200. The security system 1220 receives potentially heterogeneously encrypted data from the switch/router 1210 and provides appropriately security format converted data to the switch/router 1230. The switch/router 1230 provides the converted data, which may be in plain data format, to the one or more servers 1240-1260. According to a first embodiment the one or more servers 1240-1260 include a WML content server 1240 that is reachable by an address 10.1.1.30 to receive and provide wireless data and an HTTP content server 1250 that is reachable by an address 10.1.1.31 to receive and provide wired data. According to a second embodiment, an Apache server 1260 reachable by an address 10.1.1.32 may receive and provide both wireless and wired data.

Figure 13:
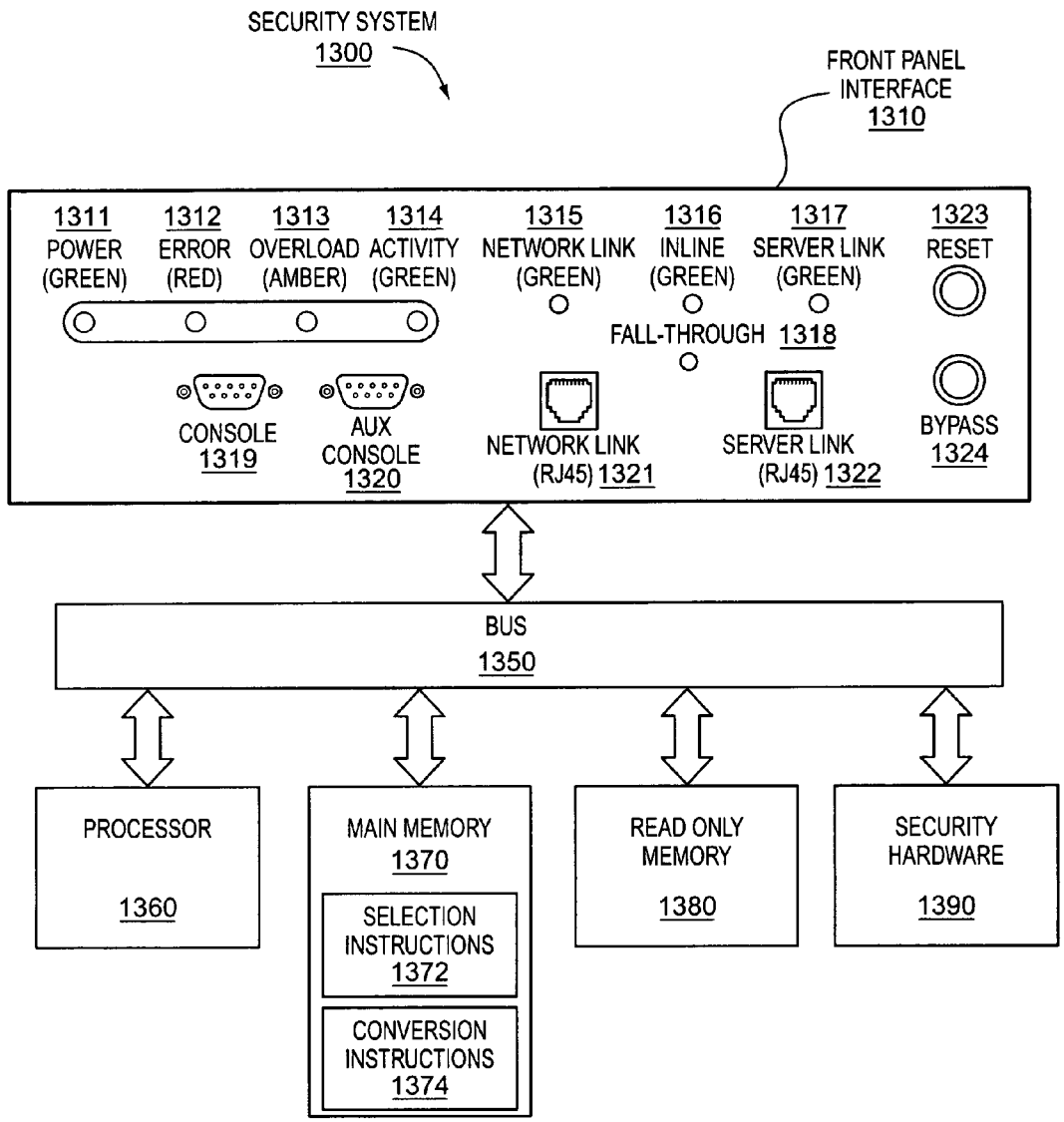
FIG. 13 shows a security system, according to one embodiment.

FIG. 13 shows a security system 1300, according to one embodiment. The security system 1300 includes a front panel interface 1310. The front panel interface may provide desired information (e.g., 1311-1318), data links (e.g., 1319-1322), and user controls (e.g., 1323-1324) that are desired for the particular implementation. In particular, the data links may include a link 1319 to a console including a display device (e.g., monitor), data entry device (e.g., keyboard), curser control device (e.g., mouse), and other components to allow the user to configure and monitor the system 1300. The data links may also include an network link 1321 to a public network or public network interface and a server link 1322 to a destination of security format converted data. These links may comprise gigabit Ethernet or RJ45 links.

The security system 1300 also includes a bus or other communication means 1350 coupled with the front panel interface 1310 to communicate information, a processing means such as a processor 1360 coupled with the bus 1350 to process data, a main memory 1370 (e.g., RAM memory) coupled with the bus 1350 to store data and instructions to be executed by the processor 1360, a read-only memory 1380 coupled with the bus 1350 to store static information and instructions for the processor 1360 (e.g., a BIOS), and security hardware 1390.

The main memory 1370 may store selection instructions 1372 and conversion instructions 1374. The instructions 1372, 1374 may be includes as applications, modules, data structures, or other logic.

According to one embodiment, security format conversion selection or security format conversion may be partially performed in hardware. For example, the hardware 1390 may comprise circuitry to perform modular exponentiation, pseudo random number generation, pseudo random key generation, DES/3DES encryption and decryption, and other desired security operations. According to one embodiment, the hardware 1390 comprises a crypto card, Field-Programmable Gate Array (FPGA), or Application Specific Integrated Circuit (ASIC) to perform such security operations.

Alternate Embodiments

The invention is not limited to the particular embodiments discussed above and those having an ordinary level of skill in the art and the benefit of the present disclosure will appreciate that many other embodiments are contemplated.

Different Security Formats

According to a first alternate embodiment, the invention may be used with other security formats than those previously described. The security format may be a format approved by the Internet Engineering Task Force (IETF), may be a format based on Transport Layer Security (TLS), may be a format that is a future enhancement of TLS, SSL, or WTLS, or may be a format such as Secure HTTP (S-HTTP), IP security (IPSec), Private Communications Technology, or others.

Distibuted Security System

According to a second alternate embodiment, the security system discussed herein may be distributed over multiple computer systems. For example, a first computer system or device may have a selection system, a second system or device may have a WTLS conversion system, and a third system or device may have an SSL conversion system.

Server With Security System

According to a third alternate embodiment, a security system, a selection system, or a conversion system may be incorporated into a server.

Web Switch

According to a fourth alternate embodiment, a security system, a selection system, or a conversion system may be incorporated into a Web switch having more network connection capabilities for increased connection scalability.

Push Mode

According to a fifth alternate embodiment, a security system, a selection system, or a conversion system may be used in a push mode. For example, a server in a data center may provide plain data to a security system that includes a security format conversion selection system to select conversion to SSL format for a wired device and conversion to WTLS format for a wireless device.

In conclusion, the present invention provides an approach for selecting a security format conversion based on security format information received from a network.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A system comprising:
    a network interface to couple with a public network to receive a first client message and first data that is encrypted according to a wireless security format and to receive a second client message and second data that is encrypted according to a wired security format, wherein the network interface comprises a first port to receive the first client message and the first data, and wherein the first port has a number selected from a group consisting of numbers 9208 through 9282;
    a selection system coupled with the network interface to select a first security format conversion for the first data and to select a second security format conversion for the second data; and
    a conversion system coupled with the selection system to perform the first security format conversion on the first wireless security format encrypted data and to perform the second security format conversion on the second wired security format encrypted data based on a conversion indication received from the network interface including information regarding a type of conversion to implement.

2. The system of claim 1, wherein the network interface comprises a second port to receive the second client message and the second data.

3. The system of claim 2, wherein the second port has number 443.

4. The system of claim 3, wherein the first port has the number 9208.

5. The system of claim 1, wherein the first data comprises Wireless Transport Layer Security encrypted data, and wherein the second data comprises Secure Sockets Layer encrypted data.

6. The system of claim 1, wherein the conversion system comprises a first security format conversion from the wireless security format encrypted data to plain data and a second security format conversion from the wired security format encrypted data to plain data.

7. The system of claim 1, wherein the selection system comprises:
    logic to receive an indication of one of a plurality of ports of the network interface on which a client message was received from the public network; and
    logic to select a security format conversion from among a plurality of format conversions including a first security format conversion from a Wireless Transport Layer Security format to another format and a second security format conversion from a Secure Sockets Layer format to another format in dependence upon the received indication of the port.

8. The system of claim 7, wherein the selection system further comprises:
    logic to receive information about a security feature supported by a client access device, and wherein the logic to select the security format conversion is capable of selecting one of the plurality of format conversions in dependence upon the received indication of the port and the received information about the security feature supported by the client access device.

9. The system of claim 1, wherein the network interface, the selection system, and the conversion system are contained within a single network device.

10. The system of claim 9, residing in a data center between the Internet and a data center server.

11. The system of claim 9, residing in a data, center between a first switch within the data center and a second switch within the data center.

12. A method comprising:
    listening on a network interface for a first client message and first data that is encrypted according to a security format for wireless data and listening on the network interface for a second client message and second data that is encrypted according to a security format for wired data, wherein the listening includes listening on a first port that has a number selected from a group consisting of numbers 9208 through 9282 for the first client message and the first data;
    receiving the first client message and the second client message from the network interface;
    selecting a first security format conversion for the first data and selecting a second security format conversion for the second data; and
    performing the first security format conversion on the first data and performing the second security format conversion on the second data based on a conversion indication received from the network interface.

13. The method of claim 12, wherein said listening on the network interface comprises listening on a second port having number 443 for the second client message.

14. The method of claim 12, wherein said selecting comprises selecting a security format conversion from Wireless Transport Layer Security format to another format for the first data and selecting a security format conversion from Secure Sockets Layer format to another format for the second data.

15. The method of claim 14, wherein the other formats comprise plain data.

16. The method of claim 12:
- wherein said listening, receiving, selecting, and performing, are each performed within a single network device; and
- wherein the single network device resides within a data center disposed between the Internet and a data center server.

17. The method of claim 12:
- wherein said listening, receiving, selecting, and performing, are each performed within a single network device; and
- wherein the single network device resides within a data center and is disposed between a first data center switch and a second data center switch.

18. The method of claim 12, wherein at least a portion of said selecting or said performing is executed in hardware.

19. A machine-readable storage device having stored thereon data representing sequences of instructions that if executed cause a machine to perform operations comprising:
- listening on a network interface for a first client message and first data that is encrypted according to a security format for wireless data, wherein the listening includes listening on a first port having a number selected from the group consisting of the numbers 9208 through 9282, and listening on a second port of the network interface for a second client message and second data that is encrypted according to a security format for wired data wherein the second port has a number 443
- receiving the first client message and the second client message from the network interface; and
- selecting a first security format conversion for the first data and selecting a second security format conversion for the second data wherein the conversions are based on a conversion indication received from the network interface.

20. The machine-readable storage device of claim 19, wherein the instructions that if executed cause the machine to select further comprise instructions that if executed cause the machine to select a security format conversion from Wireless Transport Layer Security format to another format for the first data and select a security format conversion from Secure Sockets Layer format to another format for the second data.

21. The machine-readable storage device of claim 20, wherein the other formats comprise plain data.

22. A method comprising:
- receiving an indication of one of a plurality of ports on which a client message was received from a public network including information regarding a type of conversion to implement, wherein the plurality of ports comprise a first port having a number selected from numbers 9208 through 9282; and
- selecting a security format conversion from among a plurality of format conversions including a first security format conversion from a Wireless Transport Layer Security format to another format and a second security format conversion from a Secure Sockets Layer security format to another format based upon the received indication from the port.

23. The method of claim 22, wherein the plurality of ports comprise a second port having number 443.

24. The method of claim 22, wherein the other formats comprise plain data formats.

25. The system of claim 6, further comprising a second network interface to provide the plain data.

26. The method of claim 15, further comprising providing the plain data from a second network interface.

27. The machine-readable medium of claim 21, wherein the instructions further comprise instructions that if executed cause the machine to provide the plain data from a second network interface.

28. The method of claim 22, further comprising:
- performing the selected security format conversion to plain data; and
- providing the plain data to a network through a network interface.

29. A system comprising:
- a first network interface within a data center to couple with a public network to receive a first Wireless Transport Layer Security encrypted data from a cell phone client on a port with a number in a range of 9208 through 9282, and to receive a second Secure Sockets Layer encrypted data from a personal computer client;
- a conversion system within the data center to convert the first Wireless Transport Layer Security encrypted data received from the cell phone client to plain data and to convert the second Secure Sockets Layer encrypted data received from the personal computer client to plain data based on a conversion indication received from the network interface;
- a second network interface within the data center and couplable with a private network to provide the plain data to the private network.

30. The system of claim 29, wherein the first and second network interfaces are logically disposed between first and second switches in the data center.

* * * * *